(12) United States Patent
Rudoy et al.

(10) Patent No.: US 6,249,063 B1
(45) Date of Patent: Jun. 19, 2001

(54) BATTERY CELL BYPASS WITH FRANGIBLE ACTUATOR

(75) Inventors: Edward Rudoy, Woodland Hills; Larry Leroy McCormick, Chatsworth; Edwin E. Vega, Woodland Hills; Craig W. Courtney, West Hills, all of CA (US)

(73) Assignee: NEA Electronics, Inc., Chatsworth, CA (US)

( * ) Notice: Subject to any disclaimer, the term of this patent is extended or adjusted under 35 U.S.C. 154(b) by 0 days.

(21) Appl. No.: 09/270,914

(22) Filed: Mar. 16, 1999

Related U.S. Application Data
(60) Provisional application No. 60/078,312, filed on Mar. 17, 1998.

(51) Int. Cl.⁷ .................................................. H01H 47/00
(52) U.S. Cl. .......................................... 307/125; 200/52 R
(58) Field of Search .................................. 200/333, 52 R, 200/54, 38, 173; 307/125, 131; 337/401–411; 429/7, 62; 361/124, 119

(56) References Cited

U.S. PATENT DOCUMENTS 5,438,173 * 8/1995 Rudoy et al. ...................... 200/52 R

* cited by examiner

*Primary Examiner*—Fritz Fleming
*Assistant Examiner*—Robert L Deberadinis
(74) *Attorney, Agent, or Firm*—Lewis B. Sternfels

(57) ABSTRACT

A frangible actuator and switch isolates a defective cell in a battery by switching an electrical circuit when the current through a fusible link exceeds a predetermined value. The high impedance of the defective cell causes most of the battery's current to flow through the fusible link. The actuator releases a spring-loaded plunger when the high current causes tensile failure of a fusible link. Electrical contacts coupled to the pre-loaded plunger are displaced by a predetermined distance, causing the contacts to move into or out of contact with electrical terminals. The actuator includes two mating parts held together by a restrainig wire, which is in turn held in place by the fusible link. When the fuse melts, fails in tension or otherwise triggers due to excessive current, the restraining wire loosens and allows the two actuator parts to separate. This separation in turn permits the spring loaded plunger to advance, triggering the switching action. The actuator contains the fusible link on an insulator portion rather than on one of the mating parts, so that the connecting wires will not mechanically interfere with the separation of the mating parts. Pins are used between the mating parts to prevent unwanted rotation of the parts and to prevent the resulting false activation of that could thereby occur. The switching contacts use toroidal springs as contact elements to maximize contact area and thereby increase current capacity of the switch.

64 Claims, 5 Drawing Sheets

BATTERY CELL BYPASS WITH FRANGIBLE ACTUATOR

CROSS REFERENCE TO RELATED APPLICATIONS

This application is derived from provisional application 60/078,312, filed Mar. 17, 1998.

BACKGROUND OF THE INVENTION

1. Field of the Invention

The present invention relates to an electrical switching device utilizing a frangible actuator, specifically to a device for bypassing (i.e., isolating) a failed battery cell utilizing an improved frangible actuator.

2. Description of the Related Technology

A multi-cell battery typically has the cells connected in series so that their voltages will be summed to produce a battery with a higher voltage than could be obtained with a single cell. Unfortunately, when a battery cells fails, it generally develops a high resistance. Since this resistance is in series with the other cells, it effectively disables the entire battery, even though the remaining good cells would be sufficient to keep the battery operating in a slightly degraded mode. For large batteries, where battery cost is high and replacement is difficult, it makes sense to use actuators to detect and isolate failed cells so that the battery can keep operating. Since a defective cell generally cannot be repaired, such actuators are generally one-way single-use actuators, and can be frangible (i.e., they activate by separating).

Conventional actuators (used for a variety of purposes) have a number of deficiencies. For the switch portion, a commonly-used structure provides a conductive tube with the end slightly bent in. A slightly smaller conductive cylinder fits within the tube so that it just touches the inwardly indented portion of the tube's rim. A second tube with a similarly indented end faces the first. Upon activation, the cylinder passes into the second tube, contacting its rim and providing an electrical connection between the two tubes. Unfortunately, such devices can only be used as simple on-off switches. In addition, they provide a minimal contact area, which limits the amount of occurrent that can be conducted. Also, the degradation of contact force due to heating is reduced.

Another problem with conventional actuators is that they employ frangible cylinder-type actuators, which are prone to mechanical failure, due to the manner in which certain portions can interfere with other portions during actuation. An actuator is needed that maintains the simplicity of conventional actuators, but with improved reliability and higher current capacity.

SUMMARY OF THE INVENTION

A frangible actuator may contain a plurality of separable parts, preferably in the form of two cylinder halves pressed together to form an overall cylinder shape. The cylinder halves may be held together by wrapping a restraining wire around them multiple times, and securing the ends of the restraining wire so that it stays in this position. One end of the restraining wire may be secured to one of the separable halves, while the other end may be secured by a sensor that detects when an electrical current exceeds a predetermined threshold. The sensor is preferably a fusible link which melts, separates, deforms or otherwise fails in tension when the current through it exceeds the threshold, thereby releasing the end of the restraining wire. Once the restraining wire is released, the cylinder halves may be free to separate.

A spring-loaded plunger may be held in place by the cylinder halves in their restrained position, with the end of the plunger pressed against a conical surface formed between the two halves. When the cylinder halves are allowed to separate, the force of the plunger against this conical surface may force the cylinder halves apart, allowing the plunger to continue moving forward between the cylinder halves until stopped by a physical obstacle. This motion of the plunger may activate a switch.

The sensor may be attached to an insulator at one end of the cylinder, so that the electrical connections to the sensor are held away from the cylinder halves to avoid physically interfering with them during separation. The insulator may also include two pins disposed between the cylinder halves to prevent them from rotating under the urging of the restraining wire, which can be made of a spring-like material and be spring loaded in its restraining position.

The actuator can activate an electrical switch. The switch may include a contact base formed as a conductive cylinder which slides axially within the bore of multiple electrical terminals. By attaching the contact base to the end of a non-conductive cylinder of the same diameter, the total conductive/non-conductive cylinder may slide within the terminal bores, making or breaking contact with each terminal according to which portion of the cylinder is within that terminal. Reliable electrical contact may be achieved by placing toroidal contact elements within annular grooves in the conductive cylinder. Each contact element may be in the form of a coiled spring with its two ends attached to each other, thus forming a toroid having a spiral spring traversing the circle of the toroid. By sizing the various elements so that outermost portions of the toroid are slightly larger than the diameter of the terminal bore, the contact element may be slightly compressibly deformed when within the terminal bore, thus creating a spring-loaded force at each contact point. Switches formed in this manner may be configured with one or more poles, single- or double-throw, make-before-break or break-before-make, or any combination of these, simply by changing the number and spacing of contact elements and the spacing between terminals.

BRIEF DESCRIPTION OF THE DRAWINGS

FIG. 1a' is a cross-sectional view of the invention taken along line 1a'—1a' of FIG. 1a. FIG. 1a" is an end view taken from the end opposite to that shown in FIG. 1a' of the invention depicted in FIG. 1a.

FIGS. 3a–c show details of the actuator illustrated in FIG. 1a, in which FIGS. 3a and 3b are taken orthogonally to one another.

DETAILED DESCRIPTION OF THE INVENTION

The invention can be a one-shot or single-use device which, upon application of a predetermined electrical stimulus, provides at least one closed and/or open switch connection. Depending on the arrangement of the switching elements, a preferred embodiment of the switch may be configured as a single-pole single-throw or a single-pole double-throw switch. Contacts may be configured in a make-before-break or break-before-make arrangement. Ganged and multiple switch designs are also possible.

Switch Assembly

Figure 1A:
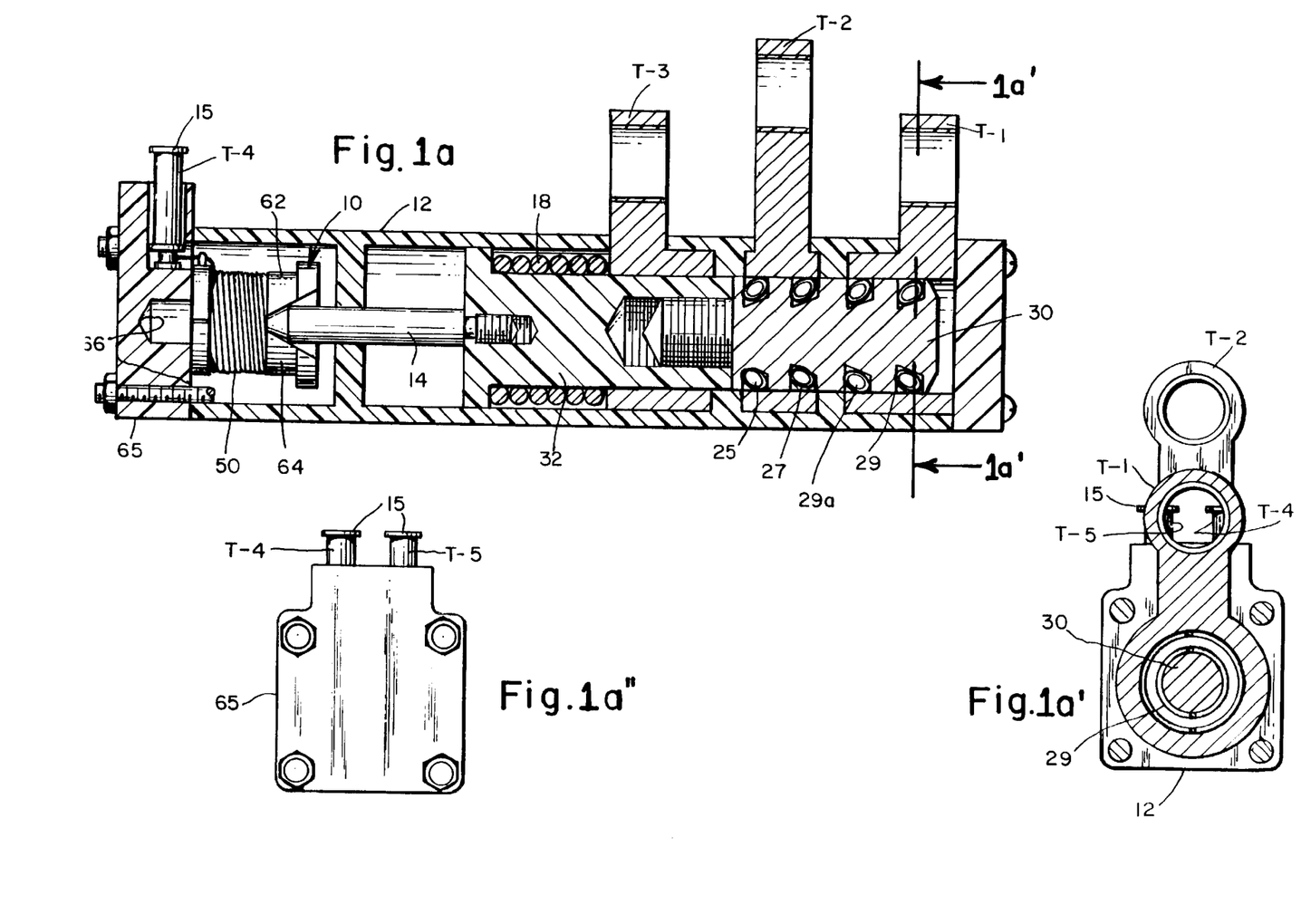
FIGS. 1a–c show a section of the invention in various positions respectively in a pre-activated state, a transitional state and a post-activated state.
Figure 1B:
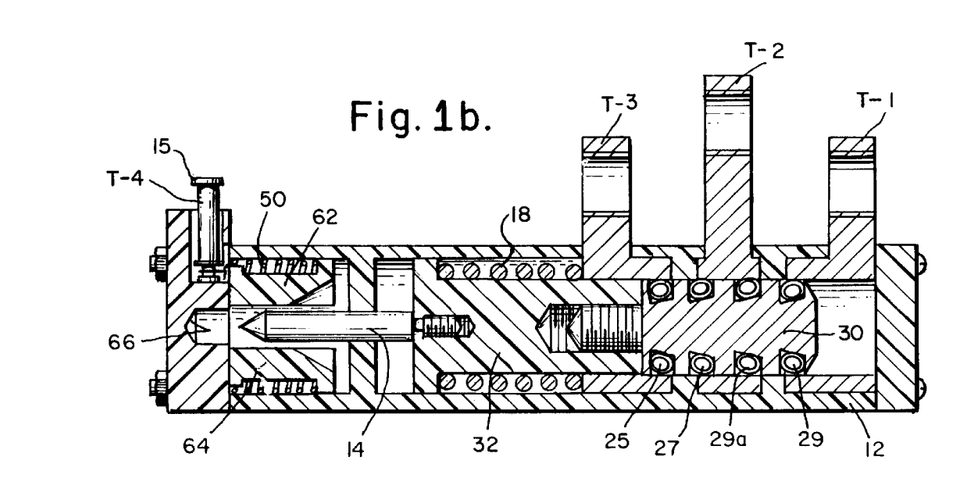
Figure 1C:
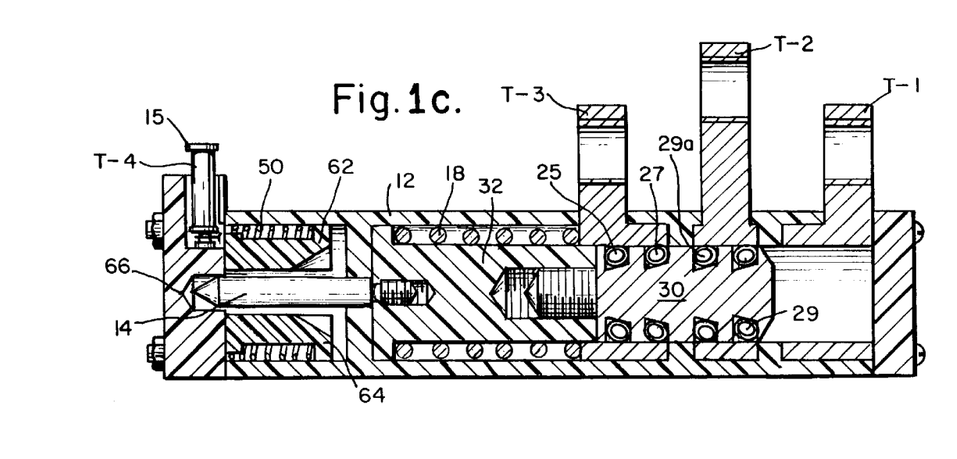

FIG. 1a' and 1a" show the battery cell bypass with frangible actuator, in an embodiment adapted for a single-pole double-throw switch. As can be seen, in the "before activation" position, the circuit between terminal T-1 and terminal T-2 is closed by conductive contact base 30, whereas the circuit between terminal T-2 and terminal T-3 is opened by non-conductive base 32. FIG. 1b shows the frangible actuator opening, allowing the plunger 14 (generally a dielectric plunger with a conductive tip) to be urged forward by compression spring 18. Terminals T-1, T-2 and T-3 are all shown connected in a make-before-break mode. As the compression spring urges the plunger after forward to its final position, FIG. 1c shows the circuit between terminals T-1 and T-2 has been opened and the circuit between terminals T-2 and T-3 has been closed, completing the operation. Improved electrical contact between contact base 30 and the terminals can be achieved by the use of coiled springs 25, 27, 29 and 29a formed in a toroidal shape. Although FIG. 1a shows a preferred embodiment employing two pairs of coiled springs 25,27 and 29 29a, other combinations may also be employed for specific applications, such as two single coiled springs (not shown) replacing the two pairs shown (25, 27 and 29, 29a) or one pair of coiled springs 25, 27 and a single coiled spring (not shown) replacing paired springs 29, 29a. Other configurations are also useful, again depending on the specific application.

FIG. 1c also shows a cross section of the actuator/switch assembly 1 in its pre-actuated condition. In a preferred embodiment, cylindrically-shaped housing 12 can provide physical support for plunger 14, non-conductive base 32, and contact base 30. Plunger 14, base 32 and contact base 30 may be effectively attached to each other so that they move as a single unit in a longitudinal direction within housing 12, and this movement may provide the switching action. Contact base 30 may be made of electrically conductive material, with contacts elements 25,27 and 29, 29a providing dependable electrical contact between contact base 30 and electrical terminals T-1, T-2, and T-3. In a preferred embodiment, contact elements 25, 27 and 29, 29a encircle contact base 30 in recessed annular grooves, and make contact with an inside surface of a circular bore within terminals T-1, T-2, T-3. This "full circle" contact area provides for a large contact surface, permitting the switch to carry more current than it could with a single-point contact area. In a preferred embodiment, contact elements 25, 27 and 29, 29a toroidal springs, which can be formed by connecting the two ends of a standard spiral-coiled spring together so the spring assumes the overall shape of a toroid. The various elements of the switch may be sized so that the outer diameter of the toroid is slightly larger that an annular contact surface of a terminal, thereby compressing or deforming the contact element when it is moved into contact with the terminal. The spring-like resistance of the contact element may thus be used to assure good contact at each point. This shape can provide a separate contact point with the terminal for each turn of the spiral in the contact element spring, thereby creating many contact points. With the current flow thereby distributed over a larger area, current density at any given point can be maintained at a lower level, with a corresponding reduction in heat generation and an increase in the surface area for dissipating the heat. This configuration also improves reliability, since poor contact at any given point (due to corrosion, physical defect, etc.) is essentially in parallel with many other good contact points, and thus has little effect on overall current flow.

FIGS. 1a, 1b, and 1c show the sequence of movement during an activation cycle. In the pre-activated state of FIG. 1a, terminal T-1 is electrically connected to terminal T-2 through contact elements 29 and 29a, contact base 30, and contact elements 25,27. As contact base 30 moves to the left (as left is depicted in the drawing), terminals T-1, T-2, and T-3 are all connected together in the transitional state of FIG. 1b. This is a make-before-break configuration, since a new connection is made with terminal T-3 before the old connection with terminal T-1 is broken. A break-before-make switch could be configured by spacing T-1 and T-3 farther apart, so that they are never connected to T-2 at the same time. FIG. 1c shows the post-activated state, in which terminal T-2 is connected to T-3 through contact elements 29 and 29a, contact base 30, and contacts 25, 27.

Another advantage of the toroid-spring contact elements is that all the forces required to assure electrical continuity are contained within the contacts themselves, and therefore are not reliant upon any external members or features to react upon.

Figure 4A:
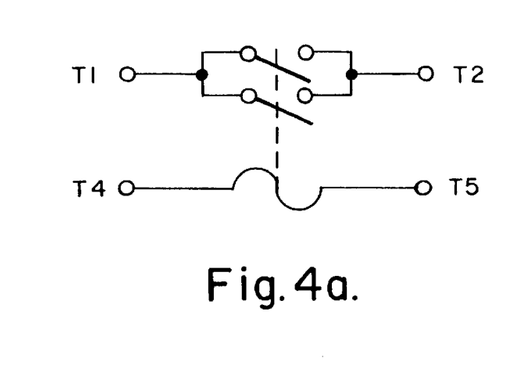
FIGS. 4a–f shows various alternative configurations of the switch depicted in FIGS. 2a and 2b, in which FIG. 4a switch is a double-pole single-throw switch, the FIG. 4b switch is a single-pole double-throw switch, the FIG. 4c switch is a single-pole double-throw switch, the FIG. 4d switch comprises two separate single-pole single-throw switches, the FIG. 4e switch is a single-pole single-throw switch, and the FIG. 4f switch is a double-pole switch with one pole being single-throw and the other being double-throw.
Figure 4B:
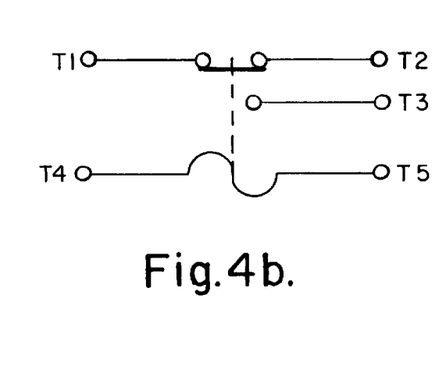
Figure 4C:
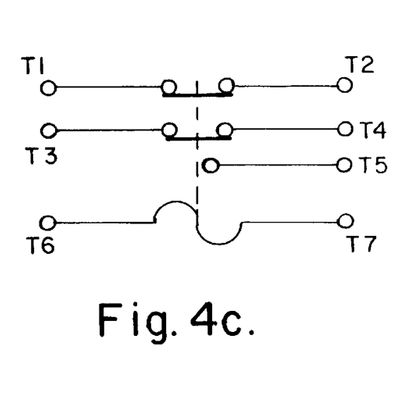
Figure 4D:
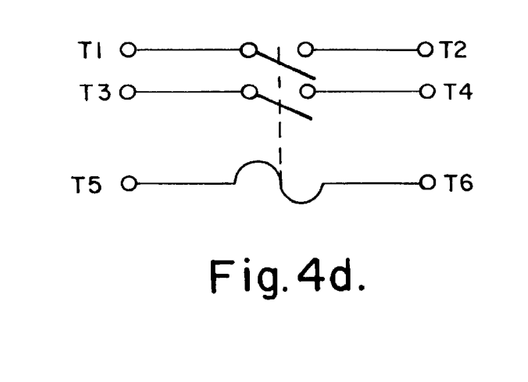
Figure 4E:
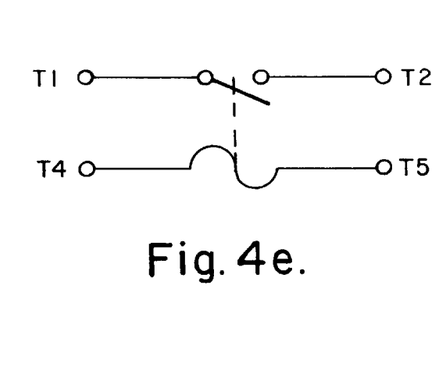
Figure 4F:
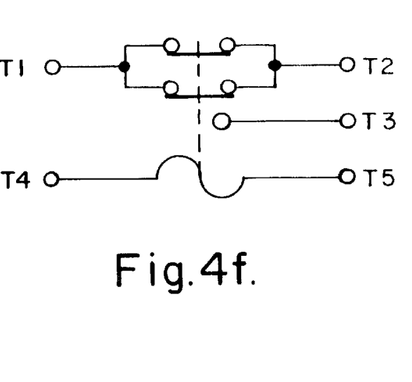

Although FIGS. 1a–c show a single-pole, double throw, make-before-break switch, other configurations can be easily incorporated. Additional poles can be implemented by adding more contact bases 30, electrically isolated from each other, if separate electrical circuits are to be switched. Single/double throw operation can be implemented simply by changing the quantity of the contact elements and associated terminals. Break-before-make or make-before-break can be implemented by simply changing the spacing between contact elements. FIGS. 4a–f show several different switch types which might be implemented. In each figure, the two terminals at the bottom of the figure represent the fusible link (which may take the form or a fusible link wire), while the remaining terminals represent the switch terminals. FIG. 4a shows a double-pole single-throw switch, FIG. 4b a single-pole double-throw switch, FIG. 4c a single-pole single-throw combined with a separate single-pole double-throw, FIG. 4d shows two separate single-pole single-throw switches, FIG. 4e has one single-pole single-throw switch, and FIG. 4f double-pole switch with one pole being single-throw and the other double-throw.

Regardless of the switching configuration, the necessary force for the switching action may be provided by spring 18, which is normally constrained from motion because plunger 14 is prevented from moving by frangible actuator 10. When actuator 10 is split into two halves as shown in FIG. 1b, plunger 14 is free to move between the two halves, and the force of spring 18 can urge plunger 14, non-conductive base 32, and contact base 30 toward insulator 65 as shown in FIG. 1c.

Actuator

The actuator may be an enabling device that initially restrains a coaxially located shaft from axial movement, but releases the restraint upon application of a predetermined minimum amount of electrical current. The actuator includes a fusible link, which may include any resistive material that decreases its tensile strength in response to an increase in temperature. In a preferred embodiment, the fusible link is a length of 18-8 stainless steel wire. The actuator also includes a restraining wire, an insulator assembly, and two cylinder halves. A preferred embodiment may use several mechanical advantages to multiply the holding capability of the fusible link, such as inclined planes or cones, and multiple wraps of a restraining wire. Reliability may be improved by using anti-rotation pins, and by connecting the fusible link to a non-moving part. A current sensor, such as the fusible link, may be used to hold the restraining wire in place during normal operation, but release the restraining wire when an overcurrent condition is detected. The fusible link may be made of high-strength, corrosion-resistant, heat-resistant material with a length and diameter sufficient to create the necessary thermal and electrical effects. In a preferred embodiment, the fusible link may have an electrical resistance of about one ohm, and a diameter large enough to continuously dissipate the heat generated by a predetermined-maximum current (in one embodiment, one amp) but small enough to heat past its stress-failure point if the current exceeds that predetermined maximum. When the fusible link temperature exceeds its stress-failure point, it can release the restraining wire, which in turn may release the mechanical components of the actuator. In a preferred embodiment, stress failure is characterized by melting, separation or other tensile failure of the fusible link.

Figure 3A:
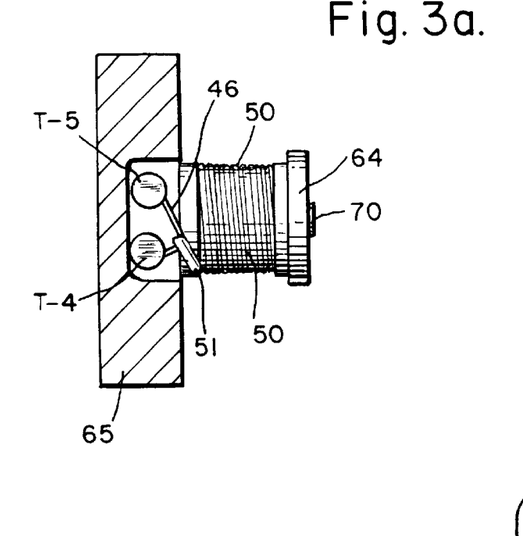
Figure 3B:
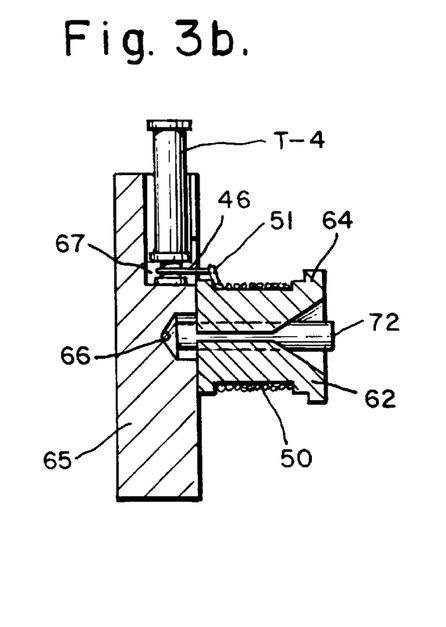
Figure 3C:
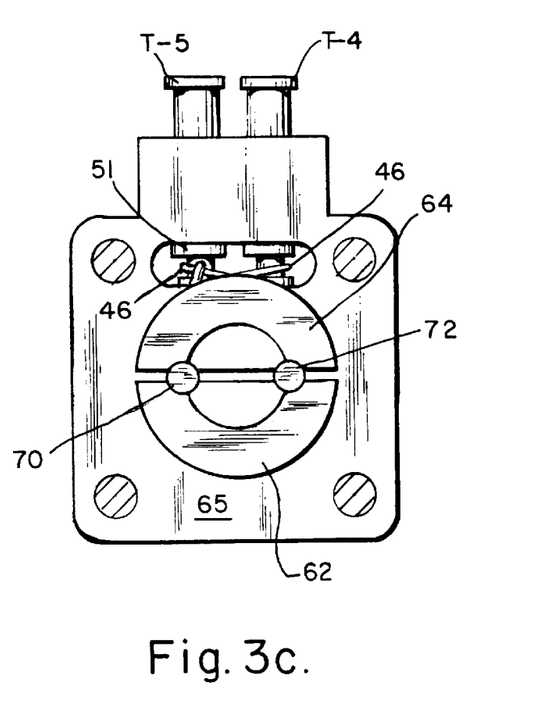

FIGS. 3a–3c show a preferred configuration of actuator 10 in greater detail. As shown, the two halves 62, 64 of a cylinder-shaped device may be bound together by multiple wraps of a restraining wire 50. Restraining wire 50 may be secured at one end to one of the cylinder halves, and restrained at the other end by fusible link 46. Fusible link 46 may be terminated at either end by electrical terminals T-4 and T-5. These terminals may be attached to insulator 65 through pre-formed holes. Access to the terminals by fusible link 46 may be acquired through access holes 67. Conventional devices typically attach the fusible link to one of the cylinder halves, where the fuse terminals or connecting wires could get caught in the uncoiling restraining wire and jam it, preventing actuation. By placing the fusible link on the non-moving, non-frangible insulator as shown, the present invention prevents this problem by keeping all such components away from the uncoiling restraining wire 50 and the moving cylinder halves 62, 64.

When bound together as described, cylinder halves 62, 64 may form a pyramid-shaped or cone-shaped recess 68 at one end. In the non-actuated position shown in FIG. 1a, plunger 14 may be pressed into this recess, where it tries to force cylinder halves 62, 64 apart with the insertion force provided by spring 18. But since the two cylinder halves are tightly bound together by restraining wire 50, this force may be unable to cause separation.

When a stress failure of fusible link 46 occurs, it can release the end of restraining wire 50, which in turn releases cylinder halves 62,64, allowing them to separate. The force of plunger 14 against recess 68 may force cylinder halves 62, 64 apart, allowing plunger 14 to penetrate between the cylinder halves until it is stopped by recess 66 in insulator 65. In a preferred embodiment, restraining wire 50 may be made of spring-like material, which in its unrestrained state is either straight or has a curvature larger than in its restrained state. When such a wire is released, it may "uncoil" from the cylinder, thus releasing the two cylinder halves. The interior walls of housing 12 can prevent the unrestrained wire from flying out too far and possibly interfering from with other parts of the device. In an alternate embodiment, restraining wire 50 may simply be flexible wire without the "memory shape" characteristics of a spring, and may be forced to uncoil simply by the force of plunger 14 separating the two cylinder halves. This configuration may require greater force from plunger spring 18, since it must overcome the friction of restraining wire 50 against the cylinder halves.

Since a spring-loaded restraining wire 50 can impart a twisting force on the cylinder, cylinder halves 62, 64 must be prevented from rotating and thereby unwinding wire 50, causing the actuator to inadvertently actuate. This prevention may be accomplished with pins 70, 72 inserted between the cylinder halves and attached to insulator 65. As shown in FIG. 3c, these pins can prevent cylinder halves 62, 64 from rotating but do not impede separation. Since plunger shaft 14 fits between the two pins, the pins also prevent the cylinder halves from interfering with the plunger during actuation. Conventional devices typically place the cylinders in a recess in the insulator, where frictional forces between the cylinder half and the insulator can impede the separation motion.

Fuse terminals T-4 and T-5 are shown as conductive posts, with fusible link 46 shown as a short piece of wire connected between terminals T-4 and T-5. Referring to both FIGS. 2a and 3a, as the cell fails and current flowing through diode 44 or 45 (or as noted below, other voltage sensitive electrical component) exceeds the diode threshold limit, such current is sufficient to heat and cause tensile failure of the fusible link 46. Restraining wire 50 is normally held in place by having its end 51 hooked over fusible link 46. When fusible link 46 fails in tension, hook end 51 is released, and restraining wire 50 is allowed to uncoil, thus allowing the two cylinder halves 62 and 64 to separate. Referring back to FIG. 1a, prior to separation, initiator segments 62, 64 in their closed position restrain the movement of plunger 14. As shown in FIG. 1b, when the restraining effect of restraining wire 50 is removed, plunger 14 is urged forward by spring 18, causing cylinder halves 62, 64 to be spread apart by the force of plunger 14 against angled recess 68 (see FIG. 3b). Once cylinder halves 62, 64 are open sufficiently wide, plunger 14 may continue moving forward essentially without resistance, until plunger 14 encounters end 66 of the bore, as shown in FIG. 1c.

The time it takes for the actuator to actuate is the sum of the time it takes fusible link 46 to melt or otherwise fail in tension, and the time for the mechanical parts to complete their motion. In a preferred embodiment, this total time is a few milliseconds. Variation in this time may be primarily due to the actuating current, which dictates how long it takes fusible link 46 to heat up and fail in tension. The time should be consistent for any given actuating current.

Although the cylinder halves are so named because of their shape in a preferred embodiment, they might assume various other geometric shapes as well, and there might be more than two such parts. An important consideration is that their shape and quantity permit the uncoiling of the restraining wire during actuation.

Circuit

Figure 2A:
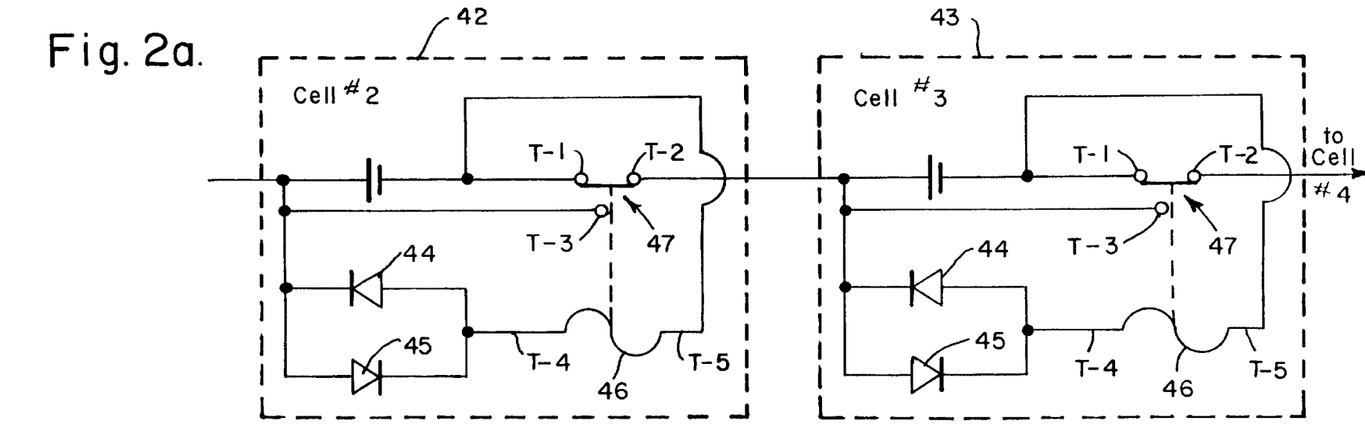
FIGS. 2a–b show the circuitry of the invention respectively before and after actuation.
Figure 2B:
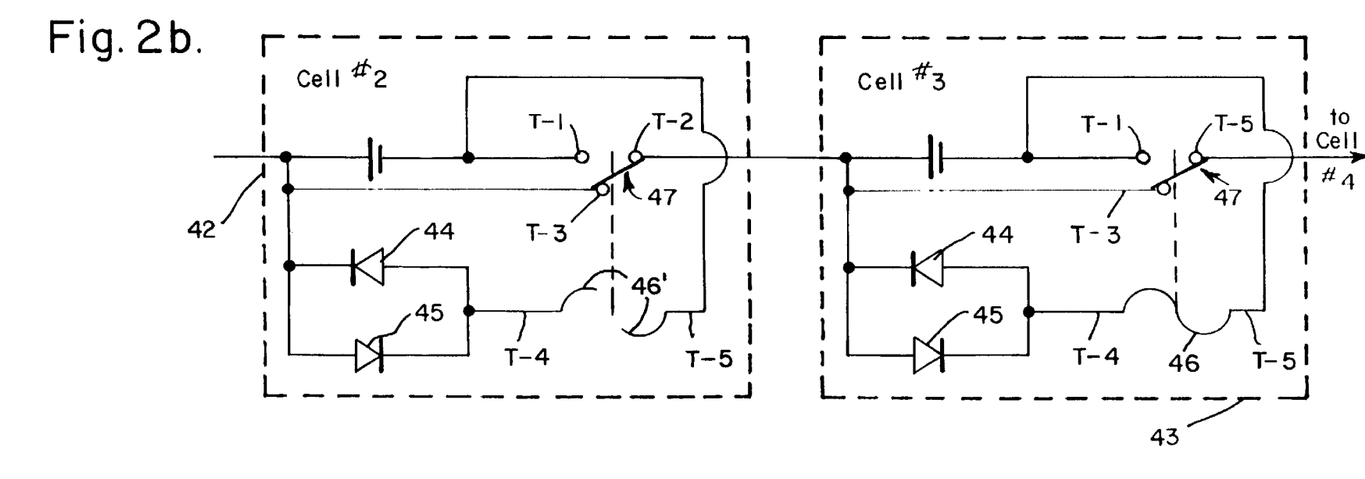

FIGS. 2a and 2b show how the device is used in the context of a battery cell bypass. FIG. 2a schematically shows bypass circuit 42 attached to a battery cell #2 in which all cells are functioning. As can be seen, the cells are connected in series, so that if one cell fails by developing high resistance (the normal failure mode for a cell), the entire battery fails, even though all other cells may be functional. In a preferred embodiment, a bypass switch and sensor mechanism includes a voltage detector, such as diodes 44,45, for detecting a voltage drop across a battery cell. Diodes 44, 45 may be connected in parallel and together connected in series with a fuse, actuator, or other current-activated cutoff device, such as fusible link 46 (FIG. 3a)

between terminals T-4 and T-5. Fusible link 46 is adapted for triggering switch 47, which has terminals T-1, T-2 and T-3, and is connected between cell #1 and cell #3. In normal operation as shown in FIG. 2a, diodes 44, 45 block current flowing in either direction unless the voltage drop across the diodes exceeds the small threshold value of the forward-biased diode. As long as the impedance of the diodes is much greater than that of the battery cell, most of the current will flow through the cell rather than the diode. Using two diodes with opposite polarity allows the sensor to operate with either battery polarity.

Each diode therefore effectively functions as a conductor in one direction and a high resistance insulator in the other direction, causing most of the current from cell #1 to travel through cell #2 to cell #3. FIG. 2b shows that in the event of a failure of cell #2, most of the current from cell #1 (which is greater than the threshold limits of the diodes) cannot pass through the high resistance of cell #2 and therefore passes through the diodes and through fusible link 46. When fusible link 46 melts, fails in tension or otherwise triggers, this actuates switch 47, causing the circuit between terminals T-1 and T-2 to be broken and the circuit between T-2 and T-3 to be completed. As can also be seen, terminal T-3 is connected to a bypass circuit beginning at the end of cell #1, such that with the bypass switch activated, a closed circuit exists between cell #1 and cell #3, bypassing cell #2 and allowing the battery to continue functioning despite the loss of that cell. In a typical application, a good battery cell may have an internal impedance of a few milli-ohms or less, a defective cell may have an impedance of hundreds of ohms or higher, and fusible link 46 in series with diodes 44, 45 may have a resistance of about one ohm.

Cell #3 is shown with a similar bypass circuit 43. In a preferred embodiment, every cell in the battery will be protected by a bypass switch of the type described. Although the switch shown is a single-pole double-throw switch, other possible combinations may be used depending on the specific application. FIGS. 2a and 2b show one possible embodiment of the invention. Alternately, transistors rather than diodes can be used to activate a bypass circuit as soon as a predetermined power level is detected. The circuit may also be activated by sensors that sense gaseous pressure or temperature within a given cell.

The embodiments of the invention described herein are illustrative and not restrictive. Numerous variations may occur to those of skill in the art that fall within the spirit of the invention. The scope of the invention is therefore limited not by the particular examples described herein, but only by the scope of the attached claims.

What is claimed is:

1. An actuator, comprising:
   an insulator;
   a current sensor mounted to and disposed on the insulator;
   a plurality of separable parts;
   a restraining wire;
   a plunger;
   wherein the plurality of separable parts have a non-actuated configuration and an actuated configuration;
   wherein in the non-actuated configuration the plurality of separable parts are restrained in proximity to one another by the restraining wire and the restraining wire is restrained by the current sensor; and
   wherein in the actuated configuration the plurality of separable parts are not restrained in proximity to one another by the restraining wire and the restraining wire is not restrained by the current sensor.

2. The actuator of claim 1, wherein the current sensor comprises a fusible link.

3. The actuator of claim 1, further comprising a plurality of pins disposed between the plurality of separable parts.

4. The actuator of claim 3, wherein the pins are positioned to prevent rotation of the plurality of separable parts.

5. The actuator of claim 1, wherein the plunger is disposed in a first position in the non-actuated configuration and is disposed in a second position in the actuated configuration.

6. The actuator of claim 5, wherein the plunger is disposed between the plurality of separable parts in the second position.

7. The actuator of claim 1, wherein the current sensor is adapted for releasing the restraining wire when a current exceeding a predetermined threshold passes through the current sensor.

8. The actuator of claim 7, wherein the current sensor includes a fusible link adapted for stress failure when a current exceeding a predetermined threshold passes through the fusible link.

9. The actuator of claim 1, wherein:
   the restraining wire includes a material with a spring effect; and
   the spring effect acts to urge the restraining wire away from the separable parts.

10. The actuator of claim 1, wherein the plunger is coupled to an electrical switch.

11. An actuator, comprising:
    an insulator;
    a current sensor;
    a plurality of separable parts;
    at least on pin disposed between the plurality of separable parts;
    a restraining wire;
    a plunger;
    wherein the plurality of separable parts have a non-actuated configuration and an actuated configuration;
    wherein in the non-actuated configuration the plurality of separable parts are restrained in proximity to one another by the restraining wire and the restraining wire is restrained by the current sensor; and
    wherein in the actuated configuration the plurality of separable parts are not restrained in proximity to one another by the restraining wire and the restraining wire is not restrained by the current sensor.

12. The actuator of claim 11, wherein the current sensor is disposed on the insulator.

13. The actuator of claim 12, wherein the current sensor includes a fusible link.

14. The actuator of claim 11, wherein the pin is positioned to prevent rotation of the plurality of separable parts.

15. The actuator of claim 11, wherein the plunger is disposed in a first position in the non-actuated configuration and is disposed in a second position in the actuated configuration.

16. The actuator of claim 15, wherein the plunger is disposed between the plurality of separable parts in the second position.

17. The actuator of claim 11, wherein the current sensor is adapted for releasing the restraining wire when a current exceeding a predetermined threshold passes through the current sensor.

18. The actuator of claim 17, wherein the current sensor includes a fusible link adapted for melting when a current exceeding a predetermined threshold passes through the fusible link.

19. The actuator of claim 11, wherein:
the restraining wire includes a material with a spring effect; and
the spring effect acts to urge the restraining wire away from the separable parts.

20. The actuator of claim 11, wherein the plunger is coupled to an electrical switch.

21. A method of actuating a device, comprising the steps of:
providing a current sensor attached to an insulator;
providing a plurality of separable parts detachably connected to the insulator;
sensing an electrical current with the current sensor;
releasing a restraining wire when the electrical current exceeds a predetermined value;
separating the plurality of separable parts from a position of proximity to one another when the restraining wire is released;
moving a plunger from a first position to a second position by the step of separating; and
initiating a predetermined action by the step of moving.

22. The method of claim 21, wherein the step of providing a plurality of separable parts includes preventing rotation of the plurality of separable parts with a pin disposed between at least two of the plurality of separable parts.

23. The method of claim 21, wherein the step of releasing includes melting a fusible link.

24. The method of claim 21, wherein the step of separating includes at least partially uncoiling the restraining wire from around the plurality of separable parts.

25. The method of claim 21, wherein the step of moving includes moving the plunger from a first position into a second position between the plurality of separable parts.

26. The method of claim 21, wherein the step of initiating includes switching an electrical switch.

27. An electrical switch for use in an actuator, comprising:
an electrically conductive contact base having a first position and a second position and adapted for moving in a linear direction between the first and second positions;
a plurality of electrical contact elements electrically coupled to the contact base;
a plurality of electrical terminals;
wherein at least one of the plurality of terminals is disposed for contacting at least one of the plurality of contact elements in the first position and disposed for not contacting the at least one of the plurality of contact elements in the second position; and
wherein the at least one of the plurality of contact elements is shaped approximately as a toroid and is configured as a garter spring with its ends joined together.

28. The switch of claim 27, wherein the contact base has an approximate cylindrical shape with a plurality of annular grooves.

29. The switch of claim 28, wherein the at least one of the plurality of contact elements is disposed in the at least one of the annular grooves.

30. The switch of claim 27, wherein at least one of the plurality of terminals includes a portion having an approximately annular shaped inner surface configured for making electrical contact between the inner surface and the at least one of the plurality of contact elements.

31. The switch of claim 27, further comprising an actuating spring configured for urging the contact base from the first position to the second position.

32. The switch of claim 27, wherein the plurality of electrical contacts are disposed as a make-before-break switch.

33. The switch of claim 27, wherein the plurality of electrical contacts are disposed as a break-before-make switch.

34. A method of switching electrical current with an actuator, comprising:
providing conductive first, second and third electrical terminals, each having a contact portion;
providing a contact base with a conductive portion and a non-conductive portion and slidably disposed within the contact portions of the first, second and third terminals;
providing first and second electrical contact elements connected to the conductive portion, each shaped as a deformable toroid and configured for contacting the contact portions; and
sliding the contact base from a first position to a second position.

35. The method of claim 34, wherein the step of sliding includes:
breaking electrical contact between the first terminal and the first contact element; and
making electrical contact between the second terminal and the second contact element.

36. The method of claim 35, wherein the step of breaking includes breaking contact at a first plurality of points and the step of making includes making contact at a second plurality of points.

37. The method of claim 35, wherein the step of sliding further includes one of:
breaking electrical contact between the third terminal and the first terminal and making electrical contact between the third terminal and the second terminal; and
making electrical contact between the third terminal and the first terminal and breaking electrical contact between the third terminal and the second terminal.

38. The method of claim 37, wherein the step of sliding further includes performing the breaking step before performing the making step.

39. The method of claim 37, wherein the step of sliding further includes performing the making step before performing the breaking step.

40. A battery cell bypass device, comprising:
a first port for electrically connecting to a first battery terminal of a first battery cell;
a second port for electrically connecting to a second battery terminal of the first battery cell;
a third port;
a switch having:
a first switchable terminal electrically coupled to the first port;
a second switchable terminal electrically coupled to the second port;
a switching terminal electrically coupled to the third port;
an actuator configured for controlling the switch;
a battery cell failure detector configured for controlling the actuator;
wherein the actuator includes:
an insulator;
a current sensor physically coupled to the insulator;
a plurality of separable parts;

a restraining wire;

a plunger;

wherein the plurality of separable parts have a non-actuated configuration and an actuated configuration;

wherein in the non-activated configuration the plurality of separable parts are restrained in proximity to one another by the restraining wire and the restraining wire is restrained by the current sensor; and wherein in the actuated configuration the plurality of separable parts are not restrained in proximity to one another by the restraining wire and the restraining wire is not restrained by the current sensor.

41. The device of claim 40, wherein the current sensor includes a fusible link.

42. The device of claim 40, further comprising a plurality of pins disposed between the plurality of separable parts.

43. The device of claim 42, wherein the pins are positioned to prevent rotation of the plurality of separable parts.

44. The device of claim 40, wherein the plunger is disposed in a first position in the non-actuated configuration and is disposed in a second position in the actuated configuration.

45. The device of claim 44, wherein the plunger is disposed between the plurality of separable parts in the second position.

46. The device of claim 40, wherein the current sensor is adapted for releasing the restraining wire when a current exceeding a predetermined threshold passes through the current sensor.

47. The device of claim 46, wherein the current sensor includes a fusible link adapted for melting when a current exceeding a predetermined threshold passes through the fusible link.

48. The device of claim 40, wherein:

the restraining wire includes a material with a spring effect; and the spring effect acts to urge the restraining wire away from the separable parts.

49. The device of claim 40, wherein the plunger is coupled to an electrical switch.

50. The device of claim 40, wherein:

the battery cell failure detector includes a detector for detecting a voltage drop electrically connected in series with the current sensor; and the battery cell failure detector and current sensor are electrically coupled between the first and second ports.

51. The device of claim 50, wherein the detector for detecting a voltage drop is a diode.

52. The device of claim 40, wherein:

the battery cell failure detector includes two diodes electrically connected to each other in parallel with opposite polarity;

the two diodes together are electrically connected in series with the current sensor; and the battery cell failure detector and current sensor are electrically coupled between the first and second ports.

53. The device of claim 40, wherein:

the first port is adapted for connecting to a second battery cell;

the third port is adapted for connecting to a third battery cell; and wherein the first battery cell is electrically connected between the second battery cell and the third battery cell.

54. A method of bypassing a cell in a multi-cell battery, comprising the steps of:

placing a current sensor on a non-frangible portion of a frangible actuator;

electrically coupling the current sensor in parallel with a battery cell;

varying the current through the current sensor inversely to the impedance in the battery cell;

actuating the frangible actuator when the current through the current sensor exceeds a predetermined threshold; and bypassing the battery cell with a switch when the frangible actuator is actuated.

55. The method of claim 54, further comprising the step of preventing rotation of frangible parts of the actuator by disposing a pin therebetween.

56. The method of claim 54, wherein the step of actuating includes melting a fusible link.

57. The method of claim 54, wherein the step of bypassing includes:

electrically disconnecting a first terminal of the cell from an adjacent cell; and electrically connecting a second terminal of the cell to the adjacent cell.

58. An isolation device for a battery having a plurality of cells, comprising:

a first battery cell having two terminals, a first terminal and a second terminal;

a second battery cell having two terminals, a first terminal and a second terminal;

a switch having:

a first post electrically coupled to the second terminal of the first battery cell;

a second post electrically coupled to the second terminal of the first battery cell;

a third post electronically coupled to the first terminal of the second battery cell; and a switching mechanism capable of switching between two positions, a first position electronically connecting the second post to the third post, and a second position electronically connecting the first post to the third post; and a failure detector coupled to the switch for sensing when the first battery cell has failed and transmitting a failure signal to said switch and, upon receiving said failure signal, the switch switches between said first position and said second position.

59. The device of claim 58, wherein:

the failure detector includes a detector for detecting a voltage drop between the first terminal and the second terminal of the first battery cell.

60. The device of claim 59, wherein:

the failure detector includes two diodes electrically connected to each other in parallel with opposite polarity; and the two diodes together are electrically connected in series with the failure detector.

61. An electrical switch for use in an actuator, comprising:

an electrically conductive contact base having a first position and a second position and adapted for moving in a linear direction between the first and second positions;

a plurality of electrical terminals;

a plurality of elastically resilient electrical contact elements coupled to one of said contact base and said electrical terminals;

wherein at least one of said plurality of terminals is disposed for contacting at least one of said plurality of contact elements in the first position and disposed for not contacting said at least one of said plurality of contact elements in the second position.

62. An electrical switch according to claim 61 wherein said at least first one of said plurality of contact elements is shaped approximately as a toroid and is configured as a garter spring with its ends joined together.

63. A method of switching electrical current with an actuator, comprising:

providing at least two conductive electrical terminals, each having a contact portion;

providing a contact base with a conductive portion and a non-conductive portion and slidably disposed within the contact portions of said terminals;

providing first and second electrical contact elements connected to the conductive portion; and sliding the contact base from a first to a second position.

64. A method of switching electrical current according to claim 63 further comprising the step of shaping each of said first and second electrical contact elements as a deformable toroid and configured for contacting the contact portions.

* * * * *